US012361861B2

(12) United States Patent
Hong et al.

(10) Patent No.: US 12,361,861 B2
(45) Date of Patent: Jul. 15, 2025

(54) DISPLAY APPARATUS

(71) Applicant: LG DISPLAY CO., LTD., Seoul (KR)

(72) Inventors: MooKyoung Hong, Gyeonggi-do (KR); Jinsol Choi, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/381,736

(22) Filed: Oct. 19, 2023

(65) Prior Publication Data

US 2024/0212571 A1 Jun. 27, 2024

(30) Foreign Application Priority Data

Dec. 23, 2022 (KR) ........................ 10-2022-0182520

(51) Int. Cl.
*G09G 3/3233* (2016.01)
*G09G 3/20* (2006.01)
*G09G 3/3275* (2016.01)

(52) U.S. Cl.
CPC ......... *G09G 3/2096* (2013.01); *G09G 3/3233* (2013.01); *G09G 3/3275* (2013.01); *G09G 2300/0842* (2013.01); *G09G 2320/0223* (2013.01); *G09G 2320/0233* (2013.01); *G09G 2320/045* (2013.01); *G09G 2330/08* (2013.01); *G09G 2330/12* (2013.01)

(58) Field of Classification Search
CPC ... G09G 2300/0842; G09G 2320/0223; G09G 2320/0233; G09G 2320/045; G09G 2330/08; G09G 2330/12; G09G 3/2096; G09G 3/3233; G09G 3/3275
See application file for complete search history.

(56) References Cited

U.S. PATENT DOCUMENTS

| | | | | |
|---|---|---|---|---|
| 2008/0180374 A1* | 7/2008 | Yoshimoto | G09G 3/3614 | 345/89 |
| 2016/0189615 A1* | 6/2016 | Kwon | G09G 3/3233 | 345/76 |
| 2018/0151121 A1* | 5/2018 | Lim | G09G 3/2081 | |
| 2020/0214127 A1* | 7/2020 | Choi | H05K 1/189 | |
| 2022/0122545 A1* | 4/2022 | Hong | G09G 3/3266 | |
| 2022/0148518 A1* | 5/2022 | Hong | G09G 3/3275 | |
| 2022/0351680 A1* | 11/2022 | Choi | G09G 3/3233 | |

FOREIGN PATENT DOCUMENTS

| | | |
|---|---|---|
| KR | 10-2016-0074762 A | 6/2016 |
| KR | 10-2016-0076179 A | 6/2016 |

* cited by examiner

*Primary Examiner* — Nitin Patel
*Assistant Examiner* — Amen W Bogale
(74) *Attorney, Agent, or Firm* — Fish & Richardson P.C.

(57) ABSTRACT

Disclosed is a display apparatus comprising a display panel including data lines connected to a driving transistor of each of subpixels for displaying an image, and reference lines connected to a sensing transistor of each of the subpixels, a data driver configured to supply a data voltage to the data lines and supplying a reference voltage to the reference lines, and a timing controller configured to control the data driver, sense a reference voltage deviation of each of the reference lines changed independent from a driving characteristic of a subpixel by supplying the reference voltage to the reference lines without supplying the data voltage to the data lines, and compensate for the reference voltage deviation.

26 Claims, 7 Drawing Sheets

DISPLAY APPARATUS

CROSS-REFERENCE TO RELATED APPLICATIONS

This application claims the benefit of the Korean Patent Application No. 10-2022-0182520 filed on Dec. 23, 2022, which is hereby incorporated by reference as if fully set forth herein.

BACKGROUND

Field of the Disclosure

The present disclosure relates to a display apparatus.

Description of the Related Art

With the development of information society, the demand for a display apparatus for displaying an image is increasing in various forms. Accordingly, a display apparatus such as a Liquid Crystal Display (LCD) device, an Organic Light Emitting Diode (OLED) display, a Micro Light Emitting Diode (micro-LED) display apparatus, a Quantum Dot Display (QD) display apparatus, and the like is used.

The display apparatus comprises a display panel in which a plurality of data lines and a plurality of gate lines are arranged and subpixels are defined at points where the plurality of data lines and the plurality of gate lines cross each other. The display apparatus also includes a data driving circuit for driving the plurality of data lines, a gate driving circuit for driving the plurality of gate lines, and a power supply circuit for supplying power required for driving the display apparatus to the display panel.

A plurality of source drive integrated circuits (ICs) are included in a data driving circuit and are disposed in parallel along one side of a display panel. Power is supplied from a power supply circuit embedded in an external control printed circuit board (C-PCB) to each of the plurality of source driver ICs, and the source driver IC is configured to sense characteristics of each subpixel defined in the display panel by using the supplied power or applies a voltage to each subpixel.

However, when the display apparatus is enlarged in size, a voltage drop occurs and the voltage applied to the display panel decreases toward both left and right ends of the display panel due to the difference in length of the wiring from the control printed circuit board C-PCB. Due to the voltage drop, a desired amount of power is not supplied to the display panel and a luminance difference is generated for each position of the display panel, thereby causing a problem of image quality defects such as vertical stripe stains.

SUMMARY

The present disclosure has been made in view of the above problems, and it is an object of the present disclosure to provide a display apparatus capable of compensating for an influence of voltage drop in which a voltage decreases toward both ends of a display panel.

An aspect of the present disclosure is directed to providing a display apparatus in which a folding characteristic and an adhesive force of the display apparatus are improved, and thus, the reliability of the display apparatus is enhanced.

In accordance with an aspect of the present disclosure, the above and other objects may be accomplished by the provision of a display apparatus comprising a display panel including data lines connected to a driving transistor of each of subpixels for displaying an image, and reference lines connected to a sensing transistor of each of the subpixels, a data driver configured to supply a data voltage to the data lines and supplying a reference voltage to the reference lines, and a timing controller configured to control the data driver, sense a reference voltage deviation of a voltage of each of the reference lines changed independently from a driving characteristic of a subpixel by supplying the reference voltage to the reference lines without supplying the data voltage to the data lines, and compensate for the sensed reference voltage deviation.

In accordance with another aspect of the present disclosure, a display apparatus is provided and comprises a display panel including subpixels for displaying an image based on a voltage difference between a data voltage and a reference voltage, and reference lines connected to the subpixels and configured to supply the reference voltage, a data driver including a plurality of analog-to-digital converters for sensing a voltage of each of the reference lines after the reference voltage is supplied to the reference lines and converting a sensed voltage of each of the reference lines, which are changed regardless of driving characteristics of the subpixels, into digital sensing data through a sensing channel corresponding to the reference lines, and a timing controller configured to control the data driver and including a reference voltage deviation compensating portion for calculating a reference voltage deviation compensation value for compensating for a load deviation between the reference lines based on the sensing data of each of the reference lines.

The display apparatus according to the aspect of the present disclosure may compensate for the influence of the voltage drop in which the magnitude of voltage decreases toward both ends of the display panel so that it is possible to prevent or reduce a luminance non-uniformity phenomenon according to the position of the display panel, thereby providing a good image quality.

In addition to the effects of the present disclosure as mentioned above, additional advantages and features of the present disclosure will be clearly understood by those skilled in the art from the above description of the present disclosure.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
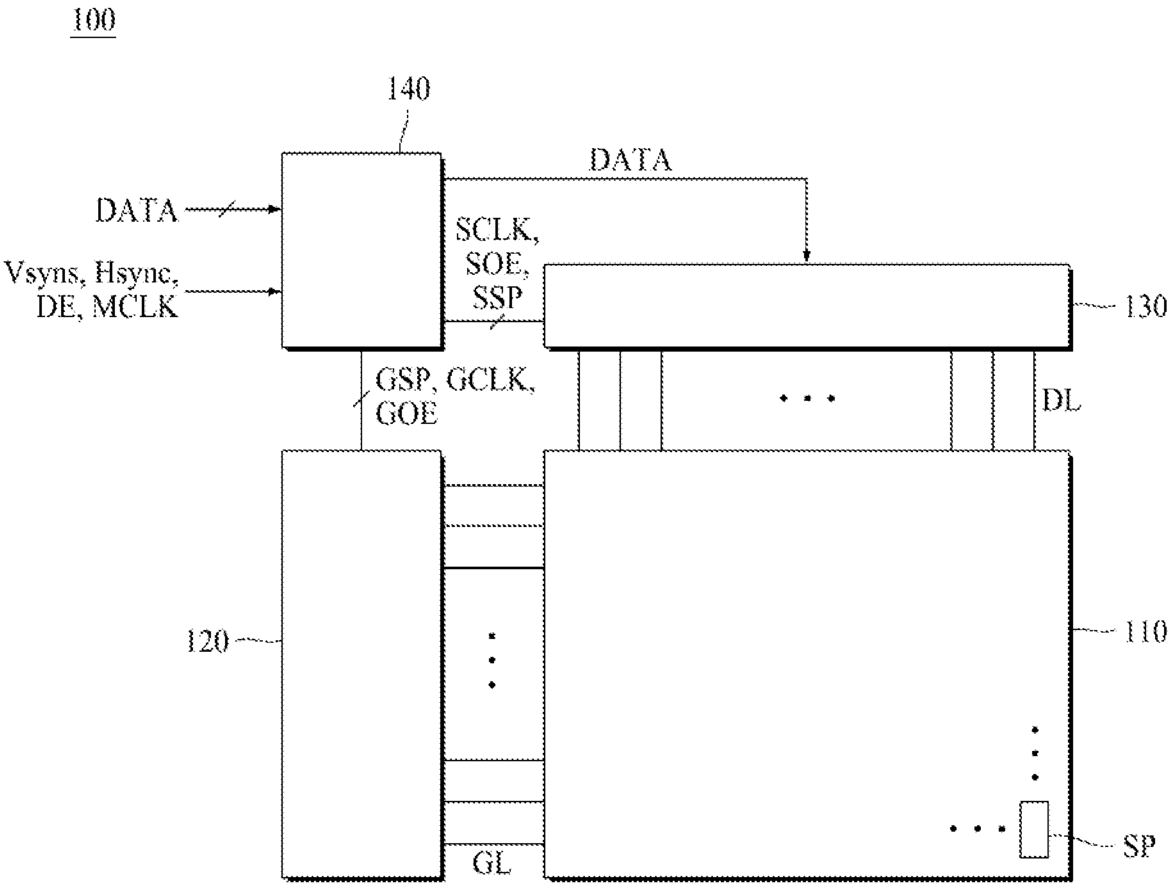
FIG. 1 is a block diagram schematically illustrating a display apparatus according to the aspect of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~' and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other and may be meant as directions having wider directivities within the range within which the components of the present disclosure may operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other and may be variously inter-operated with each other and driven technically by those skilled in the art. The aspects of the present disclosure may be carried out independently from each other or may be carried out together in co-dependent relationship.

Hereinafter, aspects of a display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a block diagram schematically illustrating a display apparatus according to the aspect of the present disclosure.

Referring to FIG. 1, a display apparatus 100 according to the aspect of the present disclosure may comprise a display panel 110 provided with a plurality of gate lines GL and a plurality of data lines DL connected thereto, and provided with a plurality of subpixels arranged in a matrix form, a gate driver 120 for driving the plurality of gate lines GL, a data driver 130 for supplying a data voltage through the plurality of data lines DL, and a timing controller 140 for controlling the gate driver 120 and the data driver 130.

The display panel 110 may display an image based on a scan signal transmitted from the gate driver 120 through the plurality of gate lines GL and a data voltage transmitted from the data driver 130 through the plurality of data lines DL.

In case of a liquid crystal display (LCD) apparatus, the display panel 110 includes a liquid crystal layer formed between two substrates. The display panel 110 may be operated in any known mode such as a Twisted Nematic (TN) mode, a Vertical Alignment (VA) mode, an In Plane Switching (IPS) mode, a Fringe Field Switching (FFS) mode, and the like. In case of the organic light emitting display apparatus, the display panel 110 may be implemented in a top emission type, a bottom emission type, a dual emission type, or the like.

The display panel 110 may include a plurality of pixels arranged in a matrix form, wherein each pixel includes subpixels SP of different colors, for example, a white subpixel, a red subpixel, a green subpixel, and a blue subpixel, and each subpixel SP may be defined by the plurality of data lines DL and the plurality of gate lines GL.

Herein, one subpixel SP may include a thin film transistor TFT formed in an intersection area of one data line DL and one gate line GL, a light emitting element such as an organic light emitting diode for charging the data voltage, a storage capacitor electrically connected to the light emitting element to maintain a voltage, and the like.

For example, when the display apparatus 100 with resolution of 2,160×3,840 includes a configuration of four subpixels SP of white W, red R, green G, and blue B, 2,160 gate lines GL and 15,360 data lines DL (3,840×4=15,360) may be provided by 3,840 data lines DL respectively connected to the four subpixels WRGB, and each subpixel SP may be disposed in the intersection area of the gate line GL and the data line DL.

The gate driver 120 is controlled by the timing controller 140. The gate driver 120 sequentially outputs scan signals to the plurality of gate lines GL that are disposed on the display panel 110 to control operation of the plurality of subpixels SP.

In the display apparatus 100 with resolution of 2,160×3,840, the scan signal is sequentially output from the first gate line to the 2160th gate line and may be referred to as 2,160 phase (2,160 phase) driving. Alternatively, the scan signal is sequentially output from the first gate line to the fourth gate line, and then the scan signal is sequentially output from the fifth gate line to the eighth gate line. That is, a case where the scan signal is sequentially output in units of four gate lines GL may be referred to as 4 phase driving. In other words, a case where the scan signal is sequentially output for each of the N gate lines GL may be referred to as N-phase driving.

The gate driver 120 may include at least one gate driving integrated circuit GDIC. The gate driver 120 may be located on a single side of the display panel 110 or on both sides of the display panel 110 according to a driving method. Alternatively, the gate driver 120 may be embedded in a bezel area of the display panel 110 to be implemented in the form of Gate In Panel (GIP).

The data driver 130 may receive digital image data DATA from the timing controller 140 and may convert the received digital image data DATA into an analog data voltage. Then, the data voltage is output to each data line DL in accordance with the timing at which the scan signal is applied through the gate line GL so that each subpixel SP connected to the data line DL may display an emission signal of luminance corresponding to the data voltage.

The data driver 130 may include at least one source driving integrated circuit SDIC, and the source driving integrated circuit SDIC may be connected to a bonding pad of the display panel 110 or may be directly disposed on the display panel 110 by a tape automated bonding (TAB) method or a chip on glass (COG) method.

For example, each source driving integrated circuit SDIC may be integrated and arranged in the display panel 110. In addition, each source driving integrated circuit SDIC may be implemented in a Chip On Film (COF) method. In this case, each source driving integrated circuit SDIC may be mounted on a circuit film and may be electrically connected to the data line DL of the display panel 110 through the circuit film.

The timing controller 140 may supply various control signals to the gate driver 120 and the data driver 130 and may control the operation of the gate driver 120 and the data driver 130. For example, the timing controller 140 may control the gate driver 120 to output the scan signal according to timing implemented in each frame and may transmit the digital image data DATA, which is received from an external source, to the data driver 130.

The timing controller 140 may receive various timing signals including a vertical synchronization signal Vsync, a horizontal synchronization signal Hsync, a data enable signal DE couple, and a main clock signal MCLK from the external source (for example, host system) together with the digital image data DATA. Accordingly, the timing controller 140 may generate a control signal using the various timing signals received from the external source and may transmit the control signal to the gate driver 120 and the data driver 130.

For example, to control the gate driver 120, the timing controller 140 may output various gate control signals including a gate start pulse GSP, a gate clock GCLK, a gate output enable signal GOE, and the like. For example, the gate start pulse GSP may control the timing at which one or more gate driving integrated circuits GDIC of the gate driver 120 start to operate. Also, the gate clock GCLK is a clock signal commonly input to one or more gate driving integrated circuits GDIC and may control the shift timing of the scan signal. Further, the gate output enable signal GOE may specify timing information of one or more gate driving integrated circuits GDIC.

To control the data driver 130, the timing controller 140 may output various data control signals including a source start pulse SSP, a source sampling clock SCLK, a source output enable signal SOE, and the like. For example, the source start pulse SSP may control the when one or more source driving integrated circuits SDICs of the data driver 130 start to sample data. The source sampling clock signal SCLK may control the timing of sampling the data in the source driving integrated circuit SDIC. The source output enable signal SOE may control the output timing of the data driver 130.

The display apparatus 100 according to the aspect of the present disclosure may include a power management integrated circuit for supplying various voltages or currents to the display panel 110, the gate driver 120, and the data driver 130 or controlling various voltages or currents to be supplied thereto.

The subpixel SP arranged in the display panel 110 of the display apparatus 100 according to the aspect of the present disclosure is located at the intersection point of the gate line GL and the data line DL, and each subpixel SP may include a light emitting element and a circuit element such as a driving transistor for emitting light. For example, the display apparatus 100 may include the light emitting element such as an organic light emitting diode OLED in each of the subpixels SP, and may display an image by controlling a current flowing through the light emitting element based on the voltage difference between the data voltage and a reference voltage.

Figure 2:
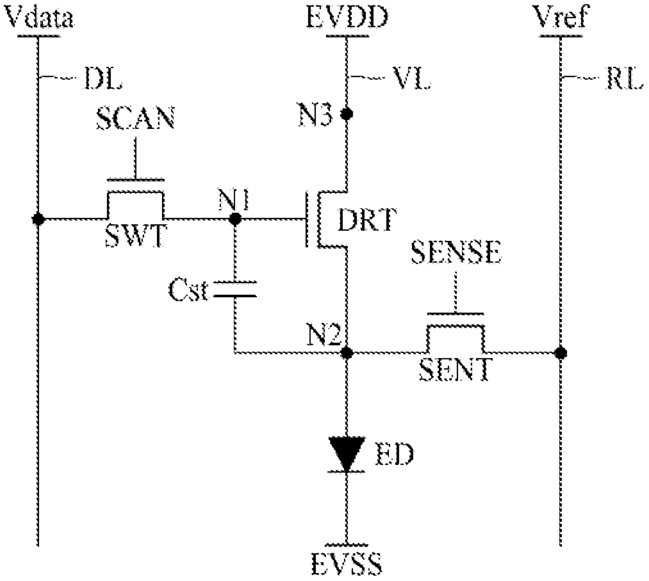
FIG. 2 is a circuit diagram illustrating a configuration of a subpixel in the display apparatus according to the aspect of the present disclosure.

FIG. 2 is a circuit diagram illustrating a configuration of a subpixel in a display apparatus according to the aspect of the present disclosure.

Referring to FIG. 2, in a display apparatus 100 according to the aspect of the present disclosure, a subpixel SP may include one or more transistors and a capacitor, and an organic light emitting diode OLED may be disposed as a light emitting element ED.

The subpixel SP may include a driving transistor DRT, a switching transistor SWT, a sensing transistor SENT, a storage capacitor Cst, and a light emitting element ED.

The driving transistor DRT may include a first node N1, a second node N2, and a third node N3. The first node N1 of the driving transistor DRT may be a gate node to which a data voltage Vdata is applied from a data driver 130 through a data line DL when the switching transistor SWT is turned on (e.g., a low impedance path is formed between nodes of the switching transistor SWT). The second node N2 of the driving transistor DRT may be electrically connected to an anode electrode of the light emitting element ED and may be a source node or a drain node. The third node N3 of the driving transistor DRT may be electrically connected to a driving voltage line VL to which a driving voltage EVDD is applied and may be a drain node or a source node.

For a display driving period, the driving voltage EVDD required to display an image may be supplied to the driving voltage line VL. For example, the driving voltage EVDD required to display an image may be 27V.

The switching transistor SWT is electrically connected between the first node N1 and the data line DL of the driving transistor DRT. A gate line GL is connected to the gate node, whereby the gate node may operate according to a scan signal supplied through the gate line GL. In addition, when the switching transistor SWT is turned on, the data voltage Vdata supplied through the data line DL is transferred to the gate node of the driving transistor DRT, thereby controlling an operation of the driving transistor DRT.

The sensing transistor SENT is electrically connected between the second node N2 of the driving transistor DRT and a reference line RL. The gate line GL is connected to the gate node, whereby the gate node may operate according to a sense signal SENSE supplied through the gate line GL. When the sensing transistor SENT is turned on, a reference voltage, which is supplied through the reference line RL, may be transferred to the second node N2 of the driving transistor DRT.

That is, the voltage in the first node N1 and the voltage in the second node N2 of the driving transistor DRT may be controlled by controlling the switching transistor SWT and the sensing transistor SENT so that the current for driving the light emitting element ED may be supplied.

The gate node of the switching transistor SWT and the sensing transistor SENT may be connected to one gate line GL or may be connected to the different gate lines GL. In the following aspect, the switching transistor SWT and the sensing transistor SENT are connected to the different gate lines GL. In this case, the switching transistor SWT and the sensing transistor SENT may be independently controlled by the scan signal SCAN and the sense signal SENSE transmitted through the different gate lines GL.

When the switching transistor SWT and the sensing transistor SENT are connected to one gate line GL, the switching transistor SWT and the sensing transistor SENT may be simultaneously controlled by the scan signal SCAN or the sense signal SENSE transmitted through one gate line GL, whereby an aperture ratio of the subpixel SP may be increased.

In some aspects, the transistor disposed in the subpixel SP may be formed of a P-type transistor as well as an N-type transistor. Herein, an example in which the transistor is composed of the N-type transistor is illustrated.

The storage capacitor Cst is electrically connected between the first node N1 and the second node N2 of the driving transistor DRT, wherein the storage capacitor Cst may maintain the data voltage Vdata during one frame.

The storage capacitor Cst may be connected between the first node N1 and the third node N3 of the driving transistor DRT according to the type of the driving transistor DRT. The anode electrode of the light emitting element ED may be electrically connected to the second node N2 of the driving transistor DRT, and a base voltage EVSS may be applied to a cathode electrode of the light emitting element ED.

For example, the base voltage EVSS may be a ground voltage or a voltage higher or lower than the ground voltage. In addition, the ground voltage EVSS may be varied according to the driving state. For example, the ground voltage EVSS at the display driving time and the ground voltage EVSS at the sensing driving time may be set to be different from each other.

The structure of the subpixel SP described in the above example above is a three transistor (3T) one capacitor (1C) structure, which is merely an example provided for the purposes of explanation. The subpixel SP may further include one or more transistors, or may further include one or more capacitors, if needed. For example, 4TIC, 5T1C, 3T2C, 4T2C, 5T2C, 6T2C, 7T1C, 7T2C, 8T2C structures, etc. are also possible. Alternatively, each of the plurality of subpixels SP may have the same structure, and some of the plurality of subpixels SP may have the different structures.

The display apparatus 100 according to the aspect of the present disclosure may use a method for measuring a current flowing by a voltage charged in the storage capacitor Cst in a characteristic value sensing period of the driving transistor DRT to sense a characteristic value of the driving transistor DRT, for example, threshold voltage or mobility.

That is, the change in the characteristic value or the characteristic value of the driving transistor DRT in the subpixel SP may be determined by measuring the current flowing by the voltage charged in the storage capacitor Cst in the characteristic value sensing period of the driving transistor DRT.

In this case, the reference line RL transfers the reference voltage Vref. In addition, the reference line RL may serve as a sensing line for sensing the characteristic value of the driving transistor DRT in the subpixel SP. In this case, the reference line RL may also be referred to as a sensing line.

Figure 3:
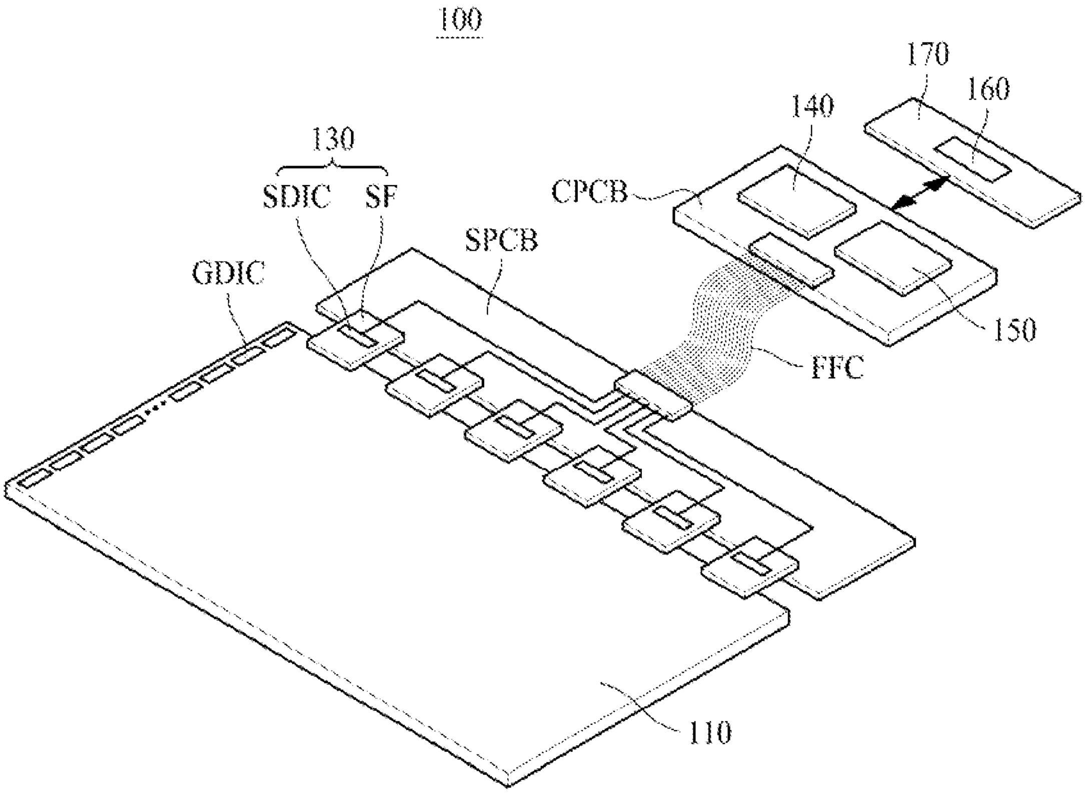
FIG. 3 is a diagram illustrating a system of the display apparatus according to the aspect of the present disclosure.

FIG. 3 shows a system of a display apparatus according to embodiments of the present disclosure.

Referring to FIG. 3, a display apparatus 100 according to embodiments of the present disclosure shows a source driving integrated circuit SDIC included in a data driver 130 and is implemented in a chip on film COF method among various methods TAB, COG, COF, etc., and a gate driver 120 is implemented in the form of GIP among various methods TAB, COG, COF, GIP, etc.

When the gate driver 120 is implemented in the form of GIP, a plurality of gate driving integrated circuits GDIC included in the gate driver 120 may be directly formed in a non-display area of a display panel 110. For example, the gate driving integrated circuit GDIC may be supplied with various signals (clock signals, gate high signals, gate low signals, etc.) for generating a scan signal through gate driving-related signal wiring disposed in the non-display area.

In addition, at least one source driving integrated circuit SDIC included in the data driver 130 may be mounted on a source film SF, and one side of the source film SF may be electrically connected to the display panel 110. The electrical lines or electrical wirings for electrically connecting the source driving integrated circuit SDIC to the display panel 110 may be disposed on the source film SF.

The display apparatus 100 may comprise at least one source printed circuit board SPCB for a circuit connection between the plurality of source driving integrated circuits SDIC and other devices, and a control printed circuit board CPCB for mounting control components and various electric devices.

At least one source printed circuit board SPCB may be connected to the opposite side of the source film SF on which the source driving integrated circuit SDIC is mounted. For example, the source film SF on which the source driving integrated circuit SDIC is mounted may have one side electrically connected to the display panel 110 and the other side electrically connected to the source printed circuit board SPCB.

A timing controller 140 and a power management integrated circuit 150 may be mounted on the control printed circuit board CPCB. The timing controller 140 may control operations of the data driver 130 and the gate driver 120. The power management integrated circuit 150 may supply driving a voltage or current to the display panel 110, the data driver 130, and the gate driver 120, or may control the supplied voltage or current.

At least one source printed circuit board SPCB and the control printed circuit board CPCB may be electrically connected through at least one connection member, and the connection member may be a flexible flat cable FFC. For example, the connection member may be a flexible printed circuit FPC. Also, at least one source printed circuit board SPCB and the control printed circuit board CPCB may be integrated into a single printed circuit.

The display apparatus 100 may further include a set board 170 electrically connected to the control printed circuit board CPCB. For example, the set board 170 may be referred to as a power board. A main power management circuit 160 for managing the entire power of the display apparatus 100 may be integral or mounted on the set board 170. The main power management circuit 160 may be interlocked with the power management integrated circuit 150.

In case of the display apparatus 100 of the above-described configuration, a driving voltage may be generated by a set board 170 and may be transferred to a power management integrated circuit 150 in a control printed circuit board CPCB. The power management integrated circuit 150 may transmit the driving voltage required for the display driving or characteristic value sensing to a source printed circuit board SPCB through a flexible flat cable FFC. The driving voltage transmitted to the source printed circuit board SPCB may be supplied through a source driving integrated circuit SDIC to emit light in a specific subpixel SP in a display panel 110, or to sense the specific subpixel SP in a display panel 110.

A supply path of the driving voltage, which is generated from the set board 170 and supplied to the subpixel SP in the display panel 110, may include the set board 170, the control printed circuit board CPCB, the flexible flat cable FFC, the source printed circuit board SPCB, and a plurality of source films SF on which the source driving integrated circuit SDIC is mounted. A parasitic load may exist in each of the components in the supply path of the driving voltage. Also, each of the plurality of source driving integrated circuits SDIC is arranged in parallel along one side of the display panel 110, and each source driving integrated circuit SDIC may have a different supply path length for the driving voltage. In this case, the driving voltage may be applied to each source driving integrated circuit SDIC through the supply path affected by different parasitic loads according to the position. The difference of the parasitic load may cause a voltage drop phenomenon in which the magnitude of voltage decreases from the center of one side of the display panel 110 to both left and right ends.

The voltage drop of driving voltage is changed regardless of the driving characteristic of the subpixel SP. Even when a pixel compensation function is performed to compensate for variation or deviation of the driving characteristic (for example, a threshold voltage, mobility, etc.) of the driving transistor DRT in the subpixel SP, or a sensing unit compensation function is performed to guarantee accuracy of sensing results of a sensing unit included in each of the plurality of source driving integrated circuits SDIC, the voltage drop of driving voltage may be differently applied to each position of the display panel 110. Thus, there is a deviation of reference voltage Vref supplied with the same voltage to the subpixel SP through reference lines RL, whereby a luminance difference is generated for each position of the display panel 110, thereby generating a problem in which image quality defects such as vertical stripe stains occur.

The present disclosure provides a display apparatus capable of sensing a reference voltage deviation of each of reference lines RL which change independently from the driving characteristics of a subpixel SP to make a display panel output a desired target luminance. The desired target luminance is output when a different voltage drop is applied to different positions of display panel and also compensates for the sensed reference voltage deviation.

Hereinafter, according to the aspect of the present disclosure, a display apparatus for sensing a reference voltage deviation of each of reference lines RL regardless of the driving characteristics of subpixel SP and compensating for the sensed reference voltage deviation will be described.

Figure 4:
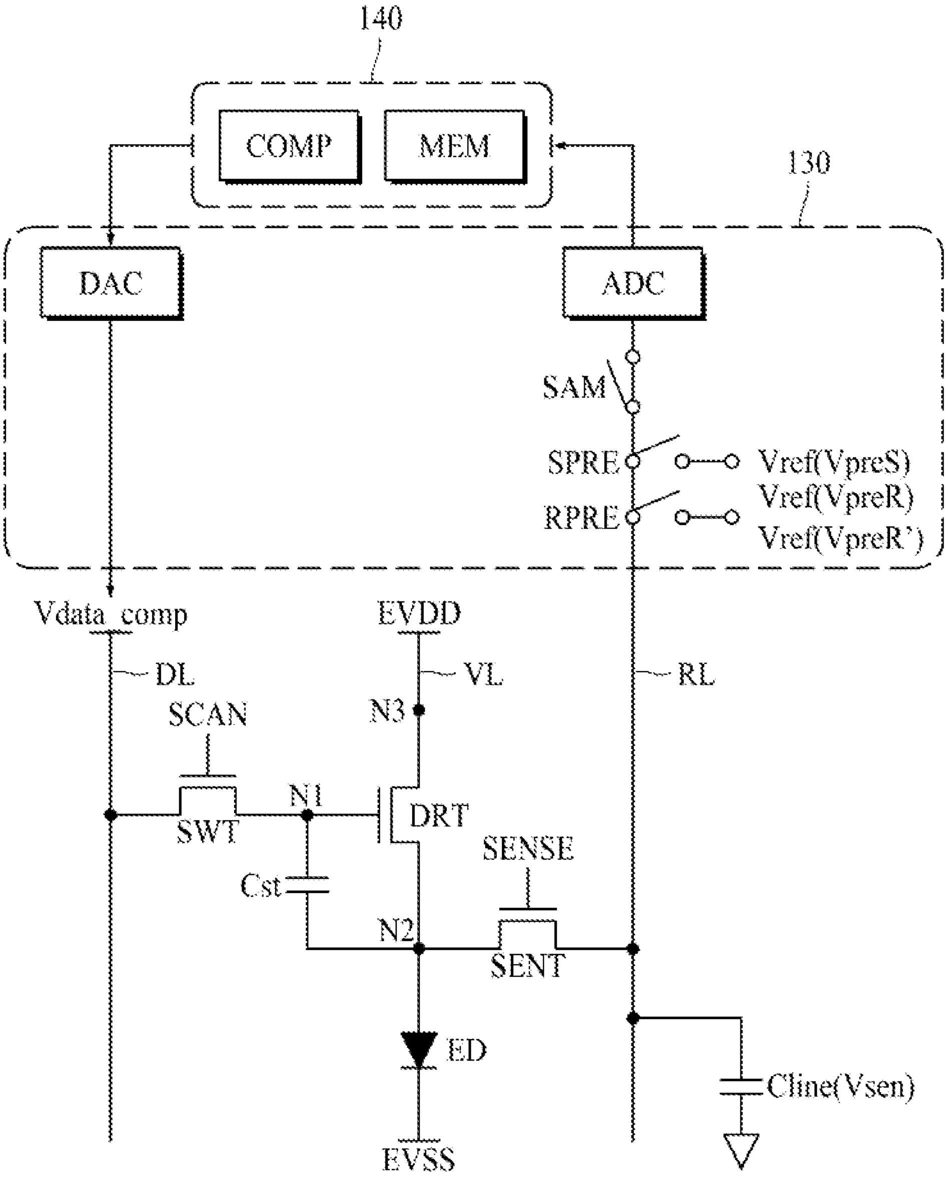
FIG. 4 is a diagram illustrating a portion of a subpixel and a data driver according to the aspect of the present disclosure.

FIG. 4 shows a portion of a subpixel and a data driver according to the aspect of the present disclosure.

Referring to FIG. 4, a display apparatus 100 according to the aspect of the present disclosure may comprise a subpixel SP including a driving transistor DRT, a switching transistor SWT, a sensing transistor SENT, a storage capacitor Cst and a light emitting element ED, a data driver 130 including an analog-to-digital converter ADC, a digital-to-analog converter DAC, a first reference switch RPRE, a second reference switch SPRE and a sampling switch SAM, and a timing controller 140 controlling the data driver 130 and including a memory MEM and a compensator COMP.

The data driver 130 is connected to a first node N1 of the subpixel SP through a data line DL, and the data driver 130 supplies a data voltage Vdata converted into an analog signal form to the data line DL through the digital-to-analog converter DAC. The switching transistor SWT of the subpixel SP is disposed between the data line DL and the first node N1. The switching transistor SWT is turned on by a scan signal SCAN, which is supplied from a gate line GL, and is configured to transmit the data voltage Vdata supplied from the data line DL to the first node N1, which is a gate node of the driving transistor DRT.

The data driver 130 is connected to a second node N2 of the subpixel SP through a reference line RL, and the data driver 130 may supply a reference voltage Vref applied through the first reference switch RPRE or second reference switch SPRE to the reference line RL. For example, the reference voltage Vref supplied to the reference line RL by the first reference switch RPRE may be a first reference voltage VpreR for a display driving, and the reference voltage Vref supplied to the reference line RL by the second reference switch SPRE may be a second reference voltage VpreS for sensing. For example, the first reference voltage VpreR may be greater than the second reference voltage VpreS. In addition, the data driver 130 may supply the sensing voltage Vsen of the reference line RL to the analog-to-digital converter ADC for converting the sensing voltage Vsen of the reference line RL into a digital signal form through the sampling switch SAM. The sensing transistor SENT of the subpixel SP is disposed between the reference line RL and the second node N2. The sensing transistor SENT is turned on by a sense signal SENSE supplied from the gate line GL. The sensing transistor SENT is configured to transmit the reference voltage Vref supplied through the reference line RL to the second node N2 of the driving transistor DRT.

The display apparatus 100 according to the aspect of the present disclosure may perform a pixel compensation function for compensating for the change or deviation of the driving characteristic of the subpixel SP. For example, the driving characteristic of the subpixel SP may include the threshold voltage or mobility of the driving transistor DRT.

For example, a driving characteristic value of the driving transistor DRT or a change in the driving characteristic value of the driving transistor DRT may be reflected as a voltage (for example, Vdata−Vth) of the second node N2 of the driving transistor DRT. The voltage of the second node N2 of the driving transistor DRT may correspond to the voltage of the reference line RL when the sensing transistor SENT is in a turned on state. In addition, a line capacitor Cline of the reference line RL may be charged by the voltage of the second node N2 of the driving transistor DRT, and the reference line RL may have a voltage corresponding to the voltage of the second node N2 of the driving transistor DRT based on the sensing voltage Vsen charged in the line capacitor Cline.

The second reference switch SPRE, the sampling switch SAM, and the analog-to-digital converter ADC of the data driver 130 may sense the voltage of the reference line RL corresponding to the voltage of the second node N2 of the driving transistor DRT.

The second reference switch SPRE may control application of the second reference voltage VpreS for sensing the driving characteristic value of the driving transistor DRT to the reference line RL. When the second reference switch SPRE is turned on, the second reference switch SPRE is connected to the reference line RL and is configured to apply the second reference voltage VpreS to the sensing transistor SENT of the subpixel SP. The second reference voltage VpreS may be applied to make the state or environment suitable for sensing the voltage of the second node N2 of the drive transistor DTR.

The sampling switch SAM may control the connection of the reference line RL to the analog-to-digital converter ADC. The sampling switch SAM may be turned on to connect the reference line RL to the analog-to-digital converter ADC. When the voltage state corresponds to the driving characteristic value of the driving transistor DTR on the second node N2 of the driving transistor DTR, the on-off timing may be controlled to turn on the sampling switch SAM. When the sampling switching SAM is turned on, the analog-to-digital converter ADC may sample and sense the voltage of the connected reference line RL.

The analog-to-digital converter ADC may convert the sensing voltage Vsen of the reference line RL into digital sensing data and may transmit the generated sensing data to the timing controller 140. For example, the sensing voltage Vsen sensed by the analog-to-digital converter ADC may be the voltage for sensing the threshold voltage or mobility of the driving transistor DRT.

The timing controller 140 may include the memory MEM for storing the sensing data applied from the analog-to-digital converter ADC or pre-storing a reference value. The timing controller may also include the compensator COMP for compensating for the change or deviation of the driving characteristic of the subpixel SP based on the received sensing data. A compensation value calculated by the compensator COMP may be stored in the memory MEM.

Accordingly, the timing controller 140 may compensate for digital image data to be supplied to the data driver 130 based on the compensation value calculated by the compensator COMP and may supply the compensated digital image data to the data driver 130.

The data driver 130 converts the compensated digital image data into an analog compensation data voltage Vdata_comp through the digital-to-analog converter DAC and supplies the compensation data voltage Vdata_comp to the data line DL. Accordingly, the driving characteristic value deviation (e.g., a threshold voltage deviation or mobility deviation) for the driving transistor DRT in the subpixel SP may be compensated.

A period of sensing the characteristic value (threshold voltage or mobility) of the driving transistor DRT may be performed before a start point of the display driving after generation of a power-on signal. For example, when the power-on signal is applied to the display apparatus 100, the timing controller 140 loads parameters necessary for driving the display panel 110 and then proceeds to drive the display. At this time, the parameters for driving the display panel 110 may include information of the characteristic value sensing and compensation, which has been previously performed on the display panel 110, and the characteristic value (e.g., threshold voltage and mobility) of the driving transistor DRT may be sensed during the parameter loading process. After the power-on signal is generated, an on-sensing process is performed by sensing a characteristic value is performed before the subpixel emits light.

A period for sensing the characteristic value of the driving transistor DRT may be performed after a generation of a power-off signal to turn off the display apparatus 100. For example, when the power-off signal is generated in the display apparatus 100, the timing controller 140 may block the data voltage supplied to the display panel 110 and may sense the characteristic value of the driving transistor DRT for a predetermined time. As described above, the process in which the characteristic value sensing is performed in the state in which the emission of the subpixel is terminated by blocking the data voltage after the generation of the power-off signal is referred to as an off-sensing process.

In addition, the period for sensing the characteristic value of the driving transistor DRT may be performed in real time during the display driving. This sensing process is referred to as a real-time RT sensing process. In case of the real-time RT sensing process, the sensing process may be performed for one or more subpixels SP in one or more subpixel SP lines per blank period during the display driving.

In the display apparatus 100 according to the aspect of the present disclosure, the reference voltage deviation of each of the reference lines RL which change regardless of when the driving characteristics of the subpixel SP is sensed, and the reference voltage deviation compensation function for compensating for the sensed reference voltage deviation is performed. For example, the reference voltage deviation may be sensed based on the load difference of each of the reference lines RL.

The sensing of the reference voltage deviation is for sensing the voltage deviation between the reference lines RL regardless of the driving characteristic value of the driving transistor DRT or the change of the driving characteristic value of the driving transistor DRT and may be performed prior to the sensing driving for the pixel compensation.

According to one aspect of the present disclosure, the reference voltage deviation may be sensed based on the voltage of the second node N2 of the driving transistor DRT. For example, when the sensing transistor SENT is turned on, the reference voltage deviation may be sensed based on the voltage of the second node N2 between the driving transistor DRT and the sensing transistor SENT. For example, the reference voltage deviation may be sensed based on the voltage of the second node N2 between the driving transistor DRT and the sensing transistor SENT while the switching transistor SWT is turned off and the sensing transistor SENT is turned on. According to another aspect of the present disclosure, the reference voltage deviation may be sensed when the reference line RL and the second node N2 of the driving transistor DRT are separated from each other. For example, when the sensing transistor SENT is turned off, the reference voltage deviation may be sensed by the use of sensing voltages Vsen, which is obtained by sampling the voltage charged in the line capacitor Cline of each of the reference lines RL. In addition, the reference voltage deviation may be sensed when the data voltage Vdata is not applied to the first node N1 of the driving transistor DRT. The reference voltage deviation may be sensed by sampling and sensing the sensing voltage Vsen charged in the line capacitor of each of the reference lines RL in the state in which the switching transistor SWT is turned off.

Also, the sensing of the reference voltage deviation is performed separately from the display driving in which the subpixel SP is driven, and the sensing driving is performed for sensing the voltage deviation between the reference lines RL corresponding to the change of voltage value or the voltage value change applied to the second node N2 of the driving transistor DRT during the display driving. For example, the reference voltage deviation may be sensed by charging a third reference voltage (or a reference line sensing voltage) corresponding to a first reference voltage VpreR' (or reference line sensing voltage) corresponding to a first reference voltage VpreR for the display driving in each of the reference lines RL for a first period and sampling the sensing voltage Vsen charged in the line capacitor Cline of each of the reference lines RL after a predetermined time period. According to the aspect of the present disclosure, the reference voltage deviation may be sensed by charging the third reference voltage VpreR' in the second node N2 between the driving transistor DRT and the sensing transistor SENT and each of the reference lines RL for the first period, and sampling the sensing voltage Vsen charged in the line capacitor Cline of each of the reference lines RL connected to the second node N2 after the predetermined time period. For example, the first period for charging the third reference voltage VpreR' may be a first horizontal period 1H.

The first reference switch RPRE, the sampling switch SAM, and the analog-to-digital converter ADC of the data driver 130 may perform the sensing of the reference voltage deviation.

The first reference switch RPRE may control whether to apply the third reference voltage VpreR' for sensing the reference voltage deviation to the reference line RL. When the first reference switch RPRE is turned on, the first reference switch RPRE may be connected to the reference line RL and may apply the third reference voltage VpreR' to the reference line RL while the sensing transistor SENT of the subpixel SP is turned off.

The sampling switch SAM may control connection of the reference line RL to the analog-to-digital converter ADC. The sampling switch SAM may be turned on to connect the reference line RL to the analog-to-digital converter ADC. When the voltage state reflects the reference voltage deviation of each of the reference lines RL, the on-off timing may be controlled to turn on the sampling switch SAM. When the sampling switch SAM is turned on, the analog-to-digital converter ADC may sample and sense the voltage of the connected reference line RL.

The analog-to-digital converter ADC may generate the sensing data by converting the sensing voltage Vsen of the reference line RL into digital data and may transmit the sensing data to the timing controller 140. For example, the sensing voltage Vsen sensed by the analog-to-digital converter ADC may be the voltage for sensing the reference voltage deviation of each of reference lines RL which are changed regardless of the driving characteristic of the subpixel SP.

The timing controller 140 may include the memory MEM for storing the sensing data applied from the analog-to-digital converter ADC or pre-storing the reference value, and the compensator COMP for compensating for the reference voltage deviation of each of the reference lines RL based on the received sensing data. The reference voltage deviation compensation value calculated by the compensator COMP may be stored in the memory MEM. For example, the reference voltage deviation compensation value may be calculated by calculating the deviation value for each reference line RL by averaging the sensing voltage of each of the reference lines RL and subtracting the averaged value from the sensing voltage of each reference line RL and inverting a sign of the deviation value of each of the calculated reference lines RL.

Accordingly, the timing controller 140 may compensate for the sensing data sensed for the pixel compensation based on the reference voltage deviation compensation value calculated by the compensator COMP, may compensate for the digital image data to be supplied to the data driver 130 based on the compensated sensing data, and may supply the compensated digital image data to the data driver 130.

The data driver 130 may convert the digital image data, which is compensated for deviation or change of the driving characteristics of the subpixel SP and the reference voltage deviation through the digital-to-analog converter DAC, into the analog compensation data voltage Vdata_comp, and may supply the compensation data voltage Vdata_comp to the data line DL. Accordingly, the deviation of the driving characteristic value (e.g., a threshold voltage deviation or mobility deviation) for the driving transistor DRT of the subpixel SP and the deviation of the reference lines RL may be compensated.

Figure 5:
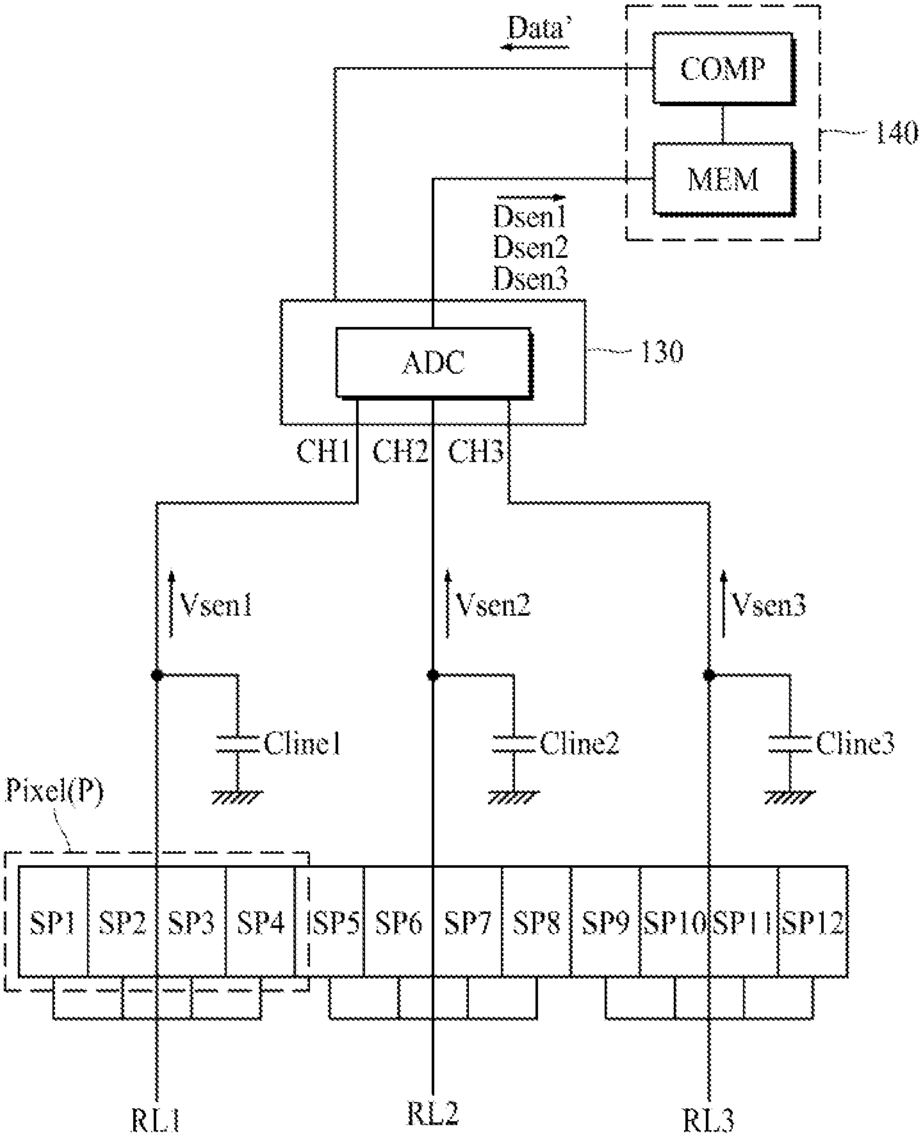
FIG. 5 is a diagram schematically illustrating a configuration for compensating for a reference voltage deviation in the display apparatus according to the aspect of the present disclosure.

FIG. 5 illustrates the reference voltage deviation compensation, sensing unit compensation, and pixel compensation in the display apparatus according to the aspect of the present disclosure.

Referring to FIG. 5, in the display apparatus 100 according to the aspect of the present disclosure, an analog-to-digital converter ADC included in the data driver 130 may include three sensing channels CH1, CH2, and CH3.

The three sensing channels CH1, CH2, and CH3 may be connected to correspond to the three reference lines RL1, RL2, and RL3. Each of the three sensing channels CH1, CH2, and CH3 may be connected to the four subpixels SP. For example, the reference line RL1 corresponding to the sensing channel CH1 may be shared and connected to the subpixels SP1, SP2, SP3, and SP4, the reference line RL2 corresponding to the sensing channel CH2 may be shared by and connected to the subpixels SP5, SP6, SP7, and SP8, and the reference line RL3 corresponding to the sensing channel CH3 may be shared and connected to the subpixels SP9, SP10, SP11, and SP12. For example, the four subpixels SP may constitute one pixel P.

For example, the four subpixels SP may include a red subpixel R, a white subpixel W, a green subpixel G, and a blue subpixel B. For example, the subpixels SP1, SP5, and SP9 may be the red subpixels R, the subpixels SP2, SP6, and SP10 may be the white subpixels W, the subpixels SP3, SP7, and SP11 may be the green subpixels G, and the subpixels SP4, SP8, and SP12 may be the blue subpixels B.

Referring to FIG. 5, the analog-to-digital converter ADC may sense the voltage Vsen of the sensing node in one subpixel SP through each of the three reference lines RL1, RL2, and RL3 at one time point.

For example, at a first time point, the analog-to-digital converter ADC may sense the voltage Vsen1 of the sensing node in the circuit of one subpixel (for example, subpixel SP1) among the four subpixels SP1, SP2, SP3, and SP4 connected to the reference line RL1 through the reference line RL1. Also, the analog-to-digital converter ADC may sense the voltage Vsen3 of the sensing node in the circuit of one subpixel (for example, subpixel SP9) among the four subpixels SP9, SP10, SP11, and SP12 connected to the reference line RL3 through the reference line RL3.

At a second time point after the first time point, the analog-to-digital converter ADC may sense the voltage Vsen1 of the sensing node in the circuit of another subpixel (for example, subpixel SP2) among the four subpixels SP1, SP2, SP3, and SP4 connected to the reference line RL1 through the reference line RL1. Also, the analog-to-digital converter ADC may sense the voltage Vsen2 of the sensing node in the circuit of another subpixel (for example, subpixel SP6) among the four subpixels SP5, SP6, SP7, and SP8 connected to the reference line RL2 through the reference line RL2. Also, the analog-to-digital converter ADC may sense the voltage Vsen3 of the sensing node in the circuit of another subpixel (for example, subpixel SP10) among the four subpixels SP9, SP10, SP11, and SP12 connected to the reference line RL3 through the reference line RL3.

Alternatively, the analog-to-digital converter ADC may simultaneously sense the sensing voltage Vsen for the three subpixels SP through each of the three reference lines RL1, RL2, and RL3 at one time point.

In some aspects, each of the three reference lines RL1, RL2, and RL3 may include the line capacitor Cline1, Cline2, and Cline3 in which the voltage of the sensing node of the corresponding subpixel SP or the voltage of the reference line itself is stored. For example, the analog-to-digital converter ADC may sense the three sensing voltages Vsen1, Vsen2, and Vsen3 through the three sensing channels CH1, CH2, and CH3 by simultaneously or individually (e.g., sequentially) detecting the sensing voltages Vsen1, Vsen2, and Vsen3 stored in the three line capacitors Cline1, Cline2, and Cline3.

The analog-to-digital converter ADC converts the sensing voltage Vsen1, Vsen2, and Vsen3 sensed through the three sensing channels CH1, CH2, and CH3 into the digital form, and outputs the converted sensing data Dsen1, Dsen2, and Dsen3 to store the converted sensing data in the memory MEM. The memory MEM may be embedded in the timing controller 140 or may be separately provided from the timing controller 140.

In the sensing mode of the reference voltage deviation, the timing controller 140 charges the third reference voltage VpreR' (or reference line sensing voltage) in each of the reference lines RL1, RL2, and RL3 for a first horizontal period 1H when the switching transistor SWT and the sensing transistor SENT of the subpixel SP are turned off, and controls the analog-to-digital converter ADC to sense the charged voltage after a predetermined period, whereby the sensing voltage Vsen1, Vsen2, and Vsen3 are sensed through the three sensing channels CH1, CH2, and CH3 and may be the voltage for each of the reference lines RL that are changed regardless of the driving characteristic of the subpixel SP.

The compensator COMP of the timing controller 140 calculates the deviation value for each reference line RL by averaging the sensing voltage of each of the reference lines RL based on the digital sensing data Dsen1, Dsen2, and Dsen3 transmitted from the sensing channels CH1, CH2, and CH3 and subtracting the averaged value from the sensing voltage of each reference line RL, and calculates the reference voltage deviation compensation value by inverting the sign of the deviation value of each of the calculated reference lines RL.

The compensator COMP of the timing controller 140 performs the reference voltage deviation compensation by reading a look-up table including, for each sensing channel, a gain value and an offset value for defining an input/output relationship of data for each analog digital converter ADC pre-stored in the memory MEM and updating the look-up table reflecting the calculated reference voltage deviation compensation value to the offset value of the corresponding analog-to-digital converter ADC.

The compensator COMP of the timing controller 140 may compensate for the characteristic change of the analog-to-digital converter ADC before or after the compensation of the reference voltage deviation. If there is the characteristic change of the analog-to-digital converter ADC, the ADC compensation function may perform the ADC compensation by updating the look-up table including characteristic information of the analog-to-digital converter ADC for each sensing channel so that the characteristic change of the analog-to-digital converter ADC is compensated.

The compensator COMP of the timing controller 140 may compensate for the deviation or change of the driving characteristics (for example, threshold voltage, mobility, etc.) of the driving transistor DRT within the subpixel SP based on the updated look-up table after the compensation of the reference voltage deviation or completion of the ADC compensation.

Figure 6:
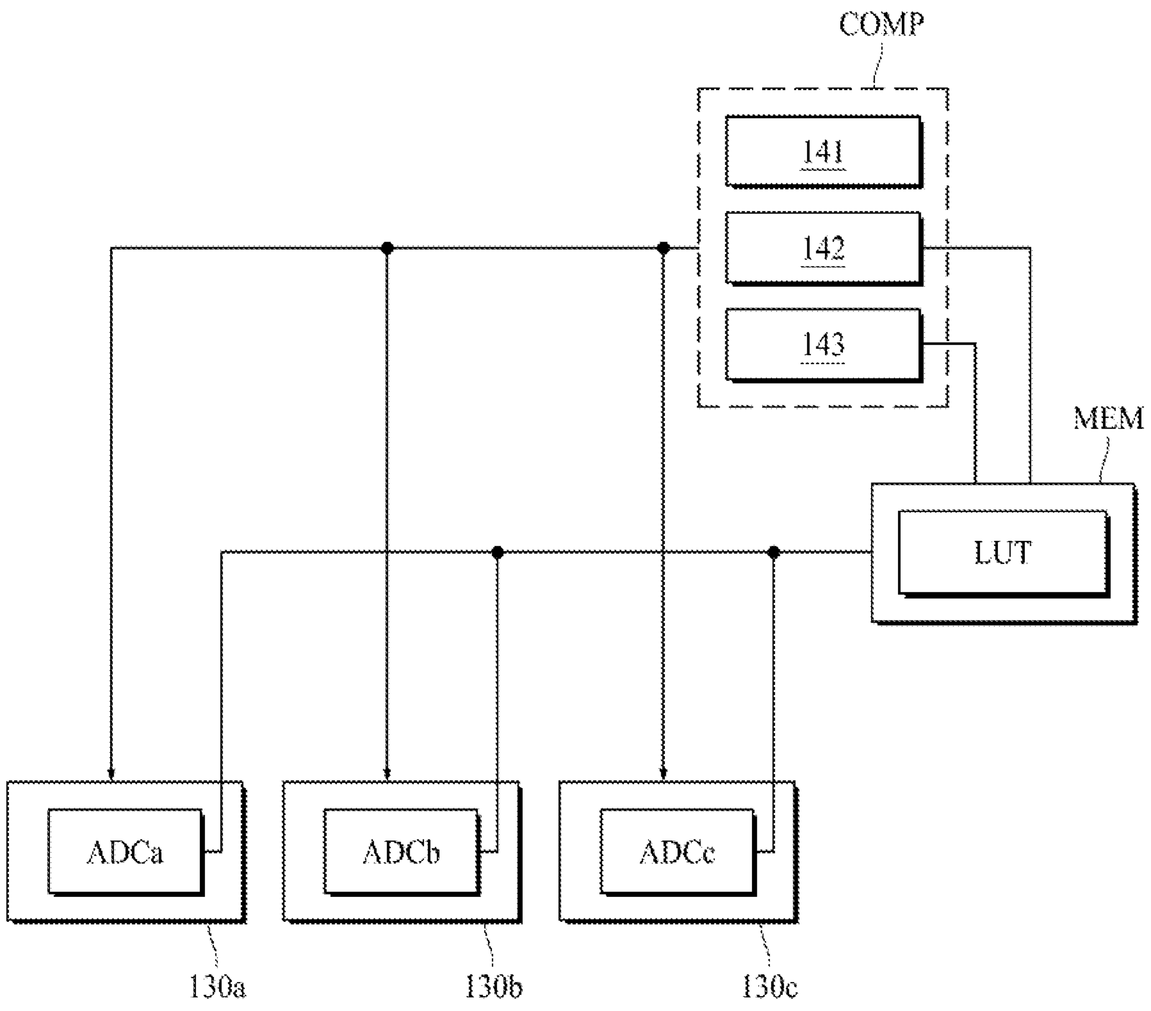
FIG. 6 is a diagram schematically illustrating a configuration for compensating for a reference voltage deviation in the display apparatus according to the aspect of the present disclosure.
Figure 7:
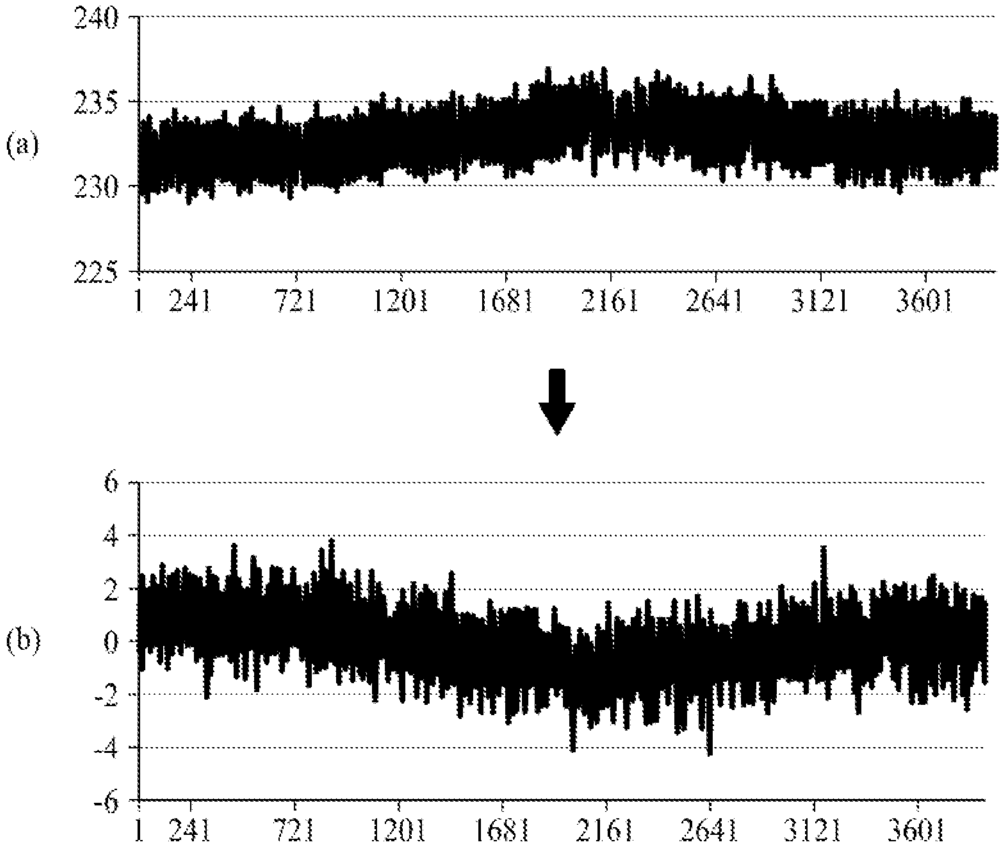
FIG. 7 is a diagram for describing a method for calculating a compensation value of the reference voltage deviation in the display apparatus according to the aspect of the present disclosure.

FIG. 6 schematically illustrates a configuration for compensating for the reference voltage deviation in the display apparatus according to the aspect of the present disclosure. FIG. 7 describes a method for calculating the compensation value of a reference voltage deviation in the display apparatus according to the aspect of the present disclosure.

Referring to FIG. 6, in the display apparatus 100 according to the aspect of the present disclosure, the compensator COMP of the timing controller 140 may include a reference voltage deviation compensating portion 141, an analog-to-digital converter compensating portion 142, and a pixel compensating portion 143.

The reference voltage deviation compensating portion 141 may calculate the reference voltage deviation compensation value for compensating for a load deviation between the reference lines RL based on the sensing data Dsen of each of the reference lines RL.

The reference voltage deviation compensating portion 141 receives digital sensing data Dsen by converting the sensing voltage Vsen of each reference line RL into the digital form from the analog-to-digital converter of each of the plurality of data driving integrated circuits 130*a*, 130*b*, and 130*c* included in the data driver 130, and calculates the reference voltage deviation compensation value using the received digital sensing data Dsen.

The reference voltage deviation compensating portion 141 may acquire the sensing voltages having different values due to the load difference of each of the reference lines RL based on the digital sensing data Dsen. The sensing voltage for each reference line RL may have the same shape as (a) of FIG. 7. For example, the sensing voltage for each reference line RL may be higher at the center of the display panel 110, which is close to a main power management circuit 160 for supplying the reference voltage, and lower at both ends of the display panel 110.

The reference voltage deviation compensating portion 141 calculates a reference voltage deviation compensation value by digitizing the voltage difference value (or deviation value) for each sensing channel according to each reference line RL by averaging the sensing voltage of each reference line RL and subtracting the total average value from the sensing voltage of each reference line RL and inverting the sign of the voltage difference value for each digitized sensing channel. The reference voltage deviation compensation value may have the same form as (b) of FIG. 7. For example, the reference voltage deviation compensation value may increase away from the center of the display panel 110 toward both left and right ends of the display panel 110.

The reference voltage deviation compensating portion 141 may transmit the calculated reference voltage deviation compensation value to the analog-to-digital converter compensating portion 142 or the pixel compensating portion 143. The analog-to-digital converter compensating portion 142 or the pixel compensating portion 143 receives the reference voltage deviation compensation value, compensates the characteristic change of the analog-to-digital converter ADC by reflecting the received reference voltage deviation compensation value, or performs the pixel compensation function for compensating for the deviation or change of the driving characteristics (for example, threshold voltage, mobility, etc.) of the driving transistor DRT in the subpixel SP.

If the characteristic value of the analog-to-digital converter ADCa, ADCb, and ADCc is changed, the analog-to-digital converter compensating portion 142 may compensate for the characteristic value of the analog-to-digital converter ADCa, ADCb, and ADCc for each sensing channel CH by updating the look-up table LUT in the memory MEM to compensate for at least one of the characteristic value of the analog-to-digital converter ADCa, ADCb, and ADCc and the characteristic value deviation between the sensing channels CH connected to the analog-to-digital converter ADCa, ADCb, and ADCc.

The analog-to-digital converter compensating portion 142 receives the reference voltage deviation compensation value from the reference voltage deviation compensating portion 141 and updates the look-up table LUT in the memory MEM based on the reference voltage deviation compensation value to compensate for the reference voltage deviation. For example, the analog-to-digital converter compensating portion 142 may perform the reference voltage deviation compensation by reading the look-up table and updating the look-up table by subtracting the calculated reference voltage deviation compensation value from the offset value of the corresponding analog-to-digital converter ADC.

The pixel compensating portion 143 may compensate for the driving characteristics of each subpixel SP based on the change of the sensing data Dsen according to the look-up table updated by the analog-to-digital converter compensating portion 142.

The pixel compensating portion 143 receives the reference voltage deviation compensation value from the reference voltage deviation compensating portion 141, calculates corrected sensing data by adding the reference voltage deviation compensation value to the sensing data sensed for the pixel compensation, and compensates for the driving characteristics of each subpixel SP by using the corrected sensing data, thereby compensating for the driving characteristics of the subpixel SP and compensating for the reference voltage deviation.

A display apparatus according to the aspect of the present disclosure may be described as follows.

A display apparatus according to an aspect of the present disclosure may include a display panel including data lines connected to a driving transistor of each of subpixels for displaying an image, and reference lines connected to a sensing transistor of each of the subpixels, a data driver configured to supply a data voltage to the data lines and supplying a reference voltage to the reference lines, and a timing controller configured to control the data driver, sense a reference voltage deviation of a voltage of each of the reference lines changed independently from a driving characteristic of a subpixel by supplying the reference voltage to the reference lines without supplying the data voltage to the data lines, and compensate for the sensed reference voltage deviation.

In the display apparatus according to an aspect of the present disclosure, the subpixel may further include a switching transistor connected to a gate of the driving transistor, and the reference voltage deviation may be sensed while the switching transistor is turned-off.

In the display apparatus according to an aspect of the present disclosure, the reference voltage deviation may be sensed regardless of the driving characteristic of the subpixel.

In the display apparatus according to an aspect of the present disclosure, the reference voltage deviation may be sensed based on a load difference between of each of the reference lines.

In the display apparatus according to an aspect of the present disclosure, the reference voltage deviation may be sensed based on a voltage charged in each of the reference lines.

In the display apparatus according to an aspect of the present disclosure, the reference voltage deviation may be sensed by charging a reference line sensing voltage in each of the reference lines during a first period and sampling the voltage charged in each of the reference lines after a predetermined time.

In the display apparatus according to an aspect of the present disclosure, the reference voltage deviation may be calculated by averaging the sampled voltages from the reference lines and subtracting the averaged value from the sampled voltage of each of the reference lines.

In the display apparatus according to an aspect of the present disclosure, the first period may be a first horizontal period, and the reference line sensing voltage may correspond to a first reference voltage supplied to the reference lines in a display mode for driving the subpixel.

In the display apparatus according to an aspect of the present disclosure, the first reference voltage may be greater than a second reference voltage supplied to the reference lines in a sensing mode for sensing the driving characteristic of the subpixel.

In the display apparatus according to an aspect of the present disclosure, the reference voltage deviation may be sensed based on a node voltage between the driving transistor of the subpixel and the sensing transistor while the sensing transistor is turned-on.

In the display apparatus according to an aspect of the present disclosure, the subpixel may further include a switching transistor connected to a gate of the driving transistor, and the reference voltage deviation may be sensed based on the node voltage between the driving transistor of the subpixel and the sensing transistor while the switching transistor is turned-off and the sensing transistor is turned-on.

In the display apparatus according to an aspect of the present disclosure, the driving characteristics of the subpixels may include a threshold voltage or mobility of the driving transistor.

In the display apparatus according to an aspect of the present disclosure, the timing controller may be configured to calculate a reference voltage deviation compensation value for compensating for the reference voltage deviation based on the reference voltage deviation, and compensate for the reference voltage deviation based on the calculated reference voltage deviation compensation value.

In the display apparatus according to an aspect of the present disclosure, the reference voltage deviation compensation value may be obtained by inverting a sign of the reference voltage deviation.

In the display apparatus according to an aspect of the present disclosure, the timing controller may be configured to perform the sensing mode for sensing the driving characteristic of the subpixel after sensing the reference voltage deviation.

In the display apparatus according to an aspect of the present disclosure, the timing controller may be configured to compensate for the reference voltage deviation by compensating for a driving characteristic value of the subpixel sensed in the sensing mode based on the reference voltage deviation compensation value.

In the display apparatus according to an aspect of the present disclosure, the data driver may include a plurality of data driving integrated circuits which divide and drive the data lines and the reference lines into a plurality of blocks, each of the plurality of data driving integrated circuits may include a plurality of analog-to-digital converters for converting analog data sensed through a sensing channel corresponding to each of the reference lines into digital data.

In the display apparatus according to an aspect of the present disclosure, the timing controller may include a look-up table including a gain value and an offset value for defining an input/output relationship of data for each of the plurality of analog-to-digital converters by each of the sensing channels, the timing controller may be configured to calculate a reference voltage deviation compensation value for compensating for the reference voltage deviation based on the reference voltage deviation, and compensate for the reference voltage deviation by updating the look-up table based on the calculated reference voltage deviation compensation value.

In the display apparatus according to an aspect of the present disclosure, the timing controller may be configured to compensate for a characteristic change of each of the plurality of analog-to-digital converters by updating the look-up table.

In the display apparatus according to an aspect of the present disclosure, the timing controller may be configured to compensate for the reference voltage deviation by updating the offset value included in the look-up table based on the reference voltage deviation compensation value.

In the display apparatus according to an aspect of the present disclosure, the timing controller may be configured to perform the sensing mode for sensing the driving characteristic of the subpixel after updating the look-up table based on the reference voltage deviation compensation value.

In the display apparatus according to an aspect of the present disclosure, the timing controller may be configured to compensate for the driving characteristic of the subpixel sensed in the sensing mode based on the updated look-up table.

A display apparatus according to an aspect of the present disclosure may include a display panel including subpixels for displaying an image based on a voltage difference between a data voltage and a reference voltage, and reference lines connected to the subpixels and configured to supply the reference voltage, a data driver including a plurality of analog-to-digital converters for sensing a voltage of each of the reference lines after the reference voltage is supplied to the reference lines and converting a sensed voltage of each of the reference lines, which are changed regardless of driving characteristics of the subpixels, into digital sensing data through a sensing channel corresponding to the reference lines, and a timing controller configured to control the data driver and including a reference voltage deviation compensating portion for calculating a reference voltage deviation compensation value for compensating for a load deviation between the reference lines based on the sensing data of each of the reference lines.

In the display apparatus according to an aspect of the present disclosure, the timing controller may further include a pixel compensating portion configured to sense a driving characteristic of the subpixels during a sensing mode and compensate the data voltage supplied to the subpixels based on driving characteristic values of the subpixels sensed in the sensing mode.

In the display apparatus according to an aspect of the present disclosure, the pixel compensating portion may compensate for the driving characteristic value of the subpixel based on the reference voltage deviation compensation value calculated from the reference voltage deviation compensating portion.

In the display apparatus according to an aspect of the present disclosure, the timing controller may further include an analog-to-digital converter compensating portion for updating a look-up table including a gain value and an offset value for defining an input/output relationship of data for each of the plurality of analog-to-digital converters by each of sensing channels, based on the reference voltage deviation compensation value calculated from the reference voltage deviation compensating portion, and the pixel compensating portion may compensate for the driving characteristic value of the subpixel based on the updated look-up table.

In the display apparatus according to an aspect of the present disclosure, the analog-to-digital converter compensating portion may compensate for a characteristic change of each of the plurality of analog-to-digital converters by updating the look-up table.

In the display apparatus according to an aspect of the present disclosure, to the reference voltage deviation, the timing controller may be configured to measure a first voltage of each reference line, determine an average voltage associated with all of the reference lines or a group of reference lines, and for each reference line of the reference lines or the group of reference lines, determine a reference voltage deviation based on a difference of the first voltage of the reference line and the average voltage.

In the display apparatus according to an aspect of the present disclosure, a parasitic resistance of the reference lines may affect the voltage charged in each of the reference lines at the predetermined time.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other embodiments by those skilled in the art. Therefore, content associated with the combination and modification should be construed as being within the scope of the present disclosure. It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel including data lines connected to a driving transistor of each of subpixels for displaying an image, and reference lines connected to a sensing transistor of each of the subpixels;

a data driver configured to supply a data voltage to the data lines and supply a reference voltage to the reference lines; and a timing controller configured to control the data driver to couple the reference voltage to the reference lines, sense a reference voltage deviation of a voltage of each of the reference lines changed independently from a driving characteristic of a subpixel by supplying the reference voltage to the reference lines without supplying the data voltage to the data lines while the reference voltage is coupled to the reference lines, and compensate for the reference voltage deviation, wherein the subpixel includes a switching transistor connected to a gate of the driving transistor, and wherein the reference voltage deviation is sensed by charging a node voltage between the driving transistor and the sensing transistor of each of the subpixels while the switching transistor is turned off and the sensing transistor is turned on during a first period, and by sampling the voltage charged at the node between the driving transistor and the sensing transistor of each of the subpixels after a predetermined time.

2. The display apparatus according to claim 1, wherein the reference voltage deviation is sensed regardless of the driving characteristic of the subpixel.

3. The display apparatus according to claim 1, wherein the reference voltage deviation is sensed based on a load difference between of each of the reference lines.

4. The display apparatus according to claim 1, wherein the reference voltage deviation is sensed based on a voltage charged in each of the reference lines.

5. The display apparatus according to claim 4, wherein the reference voltage deviation is sensed by charging a reference line sensing voltage in each of the reference lines during the first period and sampling the voltage charged in each of the reference lines after the predetermined time.

6. The display apparatus according to claim 5, wherein the reference voltage deviation is calculated by averaging the sampled voltages from the reference lines and subtracting the averaged value from the sampled voltage of each of the reference lines.

7. The display apparatus according to claim 5, wherein the first period is a first horizontal period, and wherein the reference line sensing voltage corresponds to a first reference voltage supplied to the reference lines during a display mode for driving the subpixel.

8. The display apparatus according to claim 7, wherein the first reference voltage is greater than a second reference voltage supplied to the reference lines during a sensing mode for sensing the driving characteristic of the subpixel.

9. The display apparatus according to claim 5, wherein a parasitic resistance of the reference lines affects the voltage charged in each of the reference lines at the predetermined time.

10. The display apparatus according to claim 1, wherein the driving characteristic of the subpixel includes a threshold voltage or mobility of the driving transistor.

11. The display apparatus according to claim 1, wherein the timing controller is configured to:

calculate a reference voltage deviation compensation value for compensating for the reference voltage deviation based on the reference voltage deviation, and compensate for the reference voltage deviation based on the reference voltage deviation compensation value.

12. The display apparatus according to claim 11, wherein the reference voltage deviation compensation value is obtained by inverting a sign of the reference voltage deviation.

13. The display apparatus according to claim 11, wherein the timing controller is configured to sense the driving characteristic of the subpixel after sensing the reference voltage deviation during a sensing mode.

14. The display apparatus according to claim 13, wherein the timing controller is configured to compensate for the reference voltage deviation by compensating for a driving characteristic value of the subpixel sensed during the sensing mode based on the reference voltage deviation compensation value.

15. The display apparatus according to claim 1, wherein the data driver includes a plurality of data driving integrated circuits which divide and drive the data lines and the reference lines into a plurality of blocks, and wherein each of the plurality of data driving integrated circuits includes a plurality of analog-to-digital converters for converting analog data sensed through a sensing channel corresponding to each of the reference lines into digital data.

16. The display apparatus according to claim 15, wherein the timing controller includes a look-up table including a gain value and an offset value for defining an input/output relationship of data for each of the plurality of analog-to-digital converters by each of the sensing channels, wherein the timing controller is configured to:

calculate a reference voltage deviation compensation value for compensating for the reference voltage deviation based on the reference voltage deviation, and compensate for the reference voltage deviation by updating the look-up table based on the reference voltage deviation compensation value.

17. The display apparatus according to claim 16, wherein the timing controller is configured to compensate for a characteristic change of each of the plurality of analog-to-digital converters by updating the look-up table.

18. The display apparatus according to claim 16, wherein the timing controller is configured to compensate for the reference voltage deviation by updating the offset value included in the look-up table based on the reference voltage deviation compensation value.

19. The display apparatus according to claim 18, wherein the timing controller is configured to sense the driving characteristic of the subpixel in a sensing mode after updating the look-up table based on the reference voltage deviation compensation value.

20. The display apparatus according to claim 19, wherein the timing controller is configured to compensate for the driving characteristic of the subpixel sensed in the sensing mode based on the updated look-up table.

21. The display apparatus according to claim 1, wherein, to the reference voltage deviation, the timing controller is configured to:

measure a first voltage of each reference line;

determine an average voltage associated with all of the reference lines or a group of reference lines; and for each reference line of the reference lines or the group of reference lines, determine a reference voltage deviation based on a difference of the first voltage of the reference line and the average voltage.

22. A display apparatus comprising:

a display panel including subpixels for displaying an image based on a voltage difference between a data voltage and a reference voltage, and reference lines connected to the subpixels and configured to supply the reference voltage;

a data driver including a plurality of analog-to-digital converters configured to supply the reference voltage to the reference lines and convert a sensing voltage of each of the reference lines, which change regardless of driving characteristics of the subpixels, into sensing data through a sensing channel corresponding to the reference lines; and a timing controller configured to control the data driver and including a reference voltage deviation compensating portion configured to calculate a reference voltage deviation compensation value for compensating for a reference voltage deviation between the reference lines based on the sensing data of each of the reference lines, wherein the plurality of analog-to-digital converters sense the reference voltage on the reference lines while the reference voltage is coupled to the reference lines, wherein the subpixel includes a switching transistor connected to a gate of a driving transistor and a sensing transistor connected to the reference line, and wherein the reference voltage deviation is sensed by charging a node voltage between the driving transistor and the sensing transistor of each of the subpixels while the switching transistor is turned off and the sensing transistor is turned on during a first period, and by sampling the voltage charged at the node between the driving transistor and the sensing transistor of each of the subpixels after a predetermined time.

23. The display apparatus according to claim 22, wherein the timing controller further includes a pixel compensating portion configured to sense a driving characteristic of the subpixels during a sensing mode and compensate the data voltage supplied to the subpixels based on driving characteristic values of the subpixels sensed in the sensing mode.

24. The display apparatus according to claim 23, wherein the pixel compensating portion is configured to compensate for the driving characteristic values of the subpixels based on the reference voltage deviation compensation value calculated from the reference voltage deviation compensating portion.

25. The display apparatus according to claim 24, wherein the timing controller further includes an analog-to-digital converter compensating portion for updating a look-up table including a gain value and an offset value for defining an input/output relationship of data for each of the plurality of analog-to-digital converters by each of sensing channels, based on the reference voltage deviation compensation value calculated from the reference voltage deviation compensating portion, and wherein the pixel compensating portion compensates for the driving characteristic value of the subpixel based on the updated look-up table.

26. The display apparatus according to claim 25, wherein the analog-to-digital converter compensating portion compensates for a characteristic change of each of the plurality of analog-to-digital converters by updating the look-up table.

* * * * *